United States Patent
Kitazawa et al.

(10) Patent No.: US 7,017,184 B2
(45) Date of Patent: Mar. 21, 2006

(54) IMAGE RECORDING APPARATUS AND IMAGE PROCESSING METHOD THEREFOR

(75) Inventors: Hosei Kitazawa, Chiba (JP); Yasuyuki Nagata, Kanagawa (JP); Shinya Kurobe, Tokyo (JP); Hidehiko Okumura, Tokyo (JP)

(73) Assignee: Sony Corporation, Tokyo (JP)

( * ) Notice: Subject to any disclaimer, the term of this patent is extended or adjusted under 35 U.S.C. 154(b) by 1017 days.

(21) Appl. No.: 09/872,255

(22) Filed: Jun. 1, 2001

(65) Prior Publication Data

US 2002/0018567 A1   Feb. 14, 2002

(30) Foreign Application Priority Data

Jun. 1, 2000   (JP) ............... P2000-164391

(51) Int. Cl.
*G06F 12/14*   (2006.01)
*H04L 9/32*   (2006.01)

(52) U.S. Cl. .............. 726/20; 726/17; 726/28; 726/29; 380/54; 380/216; 380/217

(58) Field of Classification Search ........ 380/203, 380/210, 22, 54, 201, 212, 216, 217, 56; 726/28, 29, 17, 20
See application file for complete search history.

(56) References Cited

U.S. PATENT DOCUMENTS 5,016,107 A * 5/1991 Sasson et al. ............ 348/231.1
5,471,267 A * 11/1995 Goto et al. ................ 396/317
5,633,678 A   5/1997 Parulski et al.

FOREIGN PATENT DOCUMENTS

| EP | 0 675 648 A2 | 10/1995 |
| EP | 1 001 601 A2 | 5/2000 |
| EP | 1 079 598 A2 | 2/2001 |
| GB | 0648050 A2 * | 9/1994 |

* cited by examiner

*Primary Examiner*—Gregory Morse
*Assistant Examiner*—John Elmore
(74) *Attorney, Agent, or Firm*—Sonnenschein, Nath & Rosenthal LLP

(57) ABSTRACT

An image indicating a copyright and its related information are set through a setting input means and those settings are stored in a related information storing means in advance. Registration image data is recorded in a detachable registration image data recording medium in advance. When an arbitrary image signal is generated by an image generating means, an image combining control means receives the generated image signal and also receives, via a registration image data input means, the registration image data stored in the registration image data recording medium. Further, the image combining control means generates a registration image signal by referring to the setting information and combines it with the arbitrary image signal. In this state, if no corresponding registration image data exists in the registration image data recording medium, image signal combining is not performed. A generated combined image signal is output from a combined image output means to a combined image recording medium or the like. Like the image combining control means, if no corresponding registration image data exists in the registration image data recording medium, the combined image output means does not perform output.

8 Claims, 11 Drawing Sheets

IMAGE RECORDING APPARATUS AND IMAGE PROCESSING METHOD THEREFOR

RELATED APPLICATION DATA

The present application claims priority to Japanese Application No. P2000-164391 filed Jun. 1, 2000, which application is incorporated herein by reference to the extent permitted by law.

BACKGROUND OF THE INVENTION

The present invention relates to an image recording apparatus and an image processing method therefor. In particular, the invention relates to an image apparatus for receiving an arbitrary image signal including a moving picture signal and recording it on a prescribed recording medium and an image processing apparatus therefor.

In recent years, the movement of protecting the right relating to such production as music, art, etc., that is, the copyright, has expanded socially and technically.

In particular, because, for example, the advancement of computers and networks made it possible to easily copy or distribute digital music, image or moving picture data, a problem has arisen that music, image, or moving picture data is copied, broadcast, displayed, or used for like purposes without permission of the copyrighter who produced it (what is called illegal use).

Image recording apparatuses for recording, on a prescribed recording medium, image data or moving picture data produced by shooting with a camera-incorporated VTR, a digital camera, or the like are required to take a measure to protect the right of a copyrighter who produced image data or moving picture data by shooting.

In particular, in the case of general-purpose image recording apparatuses, it is generally the case that a copyrighter is the owner of an image recording apparatus. To the owner of an image recording apparatus, it is desirable that not only the copyright of image data or moving picture data produced by shooting but also the owner's right, that is, a right of allowing only a permitted person to use the image recording apparatus, be protected.

However, there is a problem that conventional image recording apparatuses do not have neither of a mechanism for protecting the copyright of image data including moving picture data produced by shooting nor a mechanism for protecting the right of the owner of the image recording apparatus.

One method for protecting the right of an author is such that information to be used for claiming copyright, for example, the name or the like of the copyrighter, is added to an image or a moving picture produced by shooting and the right of the copyrighter is claimed by causing the name or the like of the copyrighter to be displayed in a reproduced image or moving picture. However, conventional image recording apparatuses cannot easily add arbitrary information to be used for claiming copyright to image data or moving picture data produced by shooting with the image recording apparatus itself.

On the other hand, one method for protecting the owner's right is such that an image recording apparatus is provided with a lock and its operation is prohibited unless it is unlocked with a key. This method requires the owner to manage the key separately from the image recording apparatus for safety. However, such management of a key is very cumbersome.

SUMMARY OF THE INVENTION

The present invention has been made in view of the above points, and an object of the invention is therefore to provide an image recording apparatus and an image processing method therefor that protect the copyright of an arbitrary image including a moving picture and a still picture. Another object of the invention is to provide an image recording apparatus and an image processing method therefor that protect the right of the owner of the image recording apparatus.

To solve the above problems, the invention provides an image recording apparatus for recording an image signal of an arbitrary image including a still picture and a moving picture on a prescribed recording medium, comprising image generating means for generating an image signal of the arbitrary image; related information storing means for storing registration information of a registration image containing information about a copyright of the arbitrary image and related information relating to the registration image; registration image data storing means for storing image data of the registration image; image combining control means for reading out the registration image data, generating a registration image signal based on the registration image data by referring to the related information, and generating a combined image signal by combining the registration image signal with the image signal of the arbitrary image; and combined image output means for outputting the combined image signal to an arbitrary device including the prescribed recording medium.

In the image recording apparatus having the above configuration, registration information of a registration image containing information about the copyright of an arbitrary image and related information relating to image data of a registration image are set and stored in the related information storing means in advance. The registration image data is stored in the registration image data storing means in advance. The image generating means generates an image signal of the arbitrary image and sends it to the image combining control means. The image combining control means reads out the registration image data, generates a registration image signal based on the registration image data by referring to the related information stored in the related information storing means, and generates a combined image signal by combining the registration image signal with the image signal that is output from the image generating means. The combined image output means outputs the combined image signal to an arbitrary device.

To solve the above problems, there is provided an image recording apparatus for recording an image signal of an arbitrary image including a still picture and a moving picture on a prescribed recording medium, comprising image generating means for generating an image signal of the arbitrary image; related information storing means for storing registration information of a prescribed registration image to be combined with the arbitrary image and related information relating to the registration image; detachable registration image data storing means for storing image data of the registration image; image combining control means for reading out the registration image data, generating a registration image signal based on the registration image data by referring to the related information, and generating a combined image signal by combining the registration image signal with the image signal, if the registration image data exists in the registration image data storing means; and combined image output means for outputting the combined image signal to an arbitrary device including the prescribed recording medium only if the registration image data exists.

In the image recording apparatus having the above configuration, registration information of a prescribed registration image to be combined with an arbitrary image and related information relating to image data of the registration image are set and stored in the related information storing means in advance. The image data of the registration image is stored in the detachable registration image data storing means in advance. The image generating means generates an image signal of the arbitrary image and sends it to the image combining control means. The image combining control means reads out the registration image data. If the registration image data exists, the image combining control means generates a registration image signal based on the registration image data by referring to the related information stored in the related information storing means, and generates a combined image signal by combining the registration image signal with the image signal that is output from the image generating means. The generated combined image signal is output from the combined image output means to an arbitrary device. If the registration image data does not exist, a combined image data is neither generated nor output from the combined image output means to the arbitrary device.

To solve the above problems, there is provided an image processing method for an image recording apparatus that records an image signal of an arbitrary image including a still picture and a moving picture on a prescribed recording medium, comprising the steps of storing, in advance, registration information of a registration image containing information about a copyright of the arbitrary image, related information relating to the registration image, and image data of the registration image; generating an image signal of the arbitrary image; reading out the registration image data; generating a registration image signal based on the registration image data by referring to the related information; generating a combined image signal by combining the registration image signal with the image signal of the arbitrary image; and recording the combined image signal on the prescribed recording medium.

In the image processing method comprising the above steps, registration information of a registration image containing information about the copyright of an arbitrary image and related information relating to image data of the registration image are set in advance and the registration image data is stored in advance. When an image signal of the arbitrary image is generated, the registration image data is read out, a registration image signal is generated based on the registration image data by referring to the related information, and a combined image signal is generated by combining the registration image signal with the image signal of the arbitrary image. The generated combined image signal is output to an arbitrary device.

To solve the above problems, there is provided an image processing method for an image recording apparatus that records an image signal of an arbitrary image including a still picture and a moving picture on a prescribed recording medium, comprising the steps of storing, in advance, in a prescribed, detachable recording medium, registration information of a prescribed registration image to be combined with the arbitrary image, related information relating to the registration image, and image data of the registration image; generating an image signal of the arbitrary image; judging whether the registration image data exists in the detachable recording medium; reading out the registration image data, generating a registration image signal based on the registration image data by referring to the related information, generating a combined image signal by combining the registration image signal with the image signal of the arbitrary image, and recording the combined image signal on the prescribed recording medium, if the registration image data exists; and refraining from recording the combined image signal on the prescribed recording medium if the registration image data does not exist.

In the image processing method comprising the above steps, registration information of a prescribed registration image to be combined with an arbitrary image and related information relating to image data of the registration image are set in advance and the image data of the registration image is stored in a detachable recording medium in advance. When an image signal of the arbitrary image is generated, the registration image data is read out from the detachable recording medium. If the registration image data exists, a registration image signal is generated based on the registration image data by referring to the related information and a combined image signal is generated by combining the registration image signal with the image signal of the arbitrary image. The generated combined image signal is recorded on the prescribed recording medium. If the registration image data does not exist, combined image data is neither generated nor recorded on the prescribed recording medium.

DESCRIPTION OF THE PREFERRED EMBODIMENTS

Figure 1:
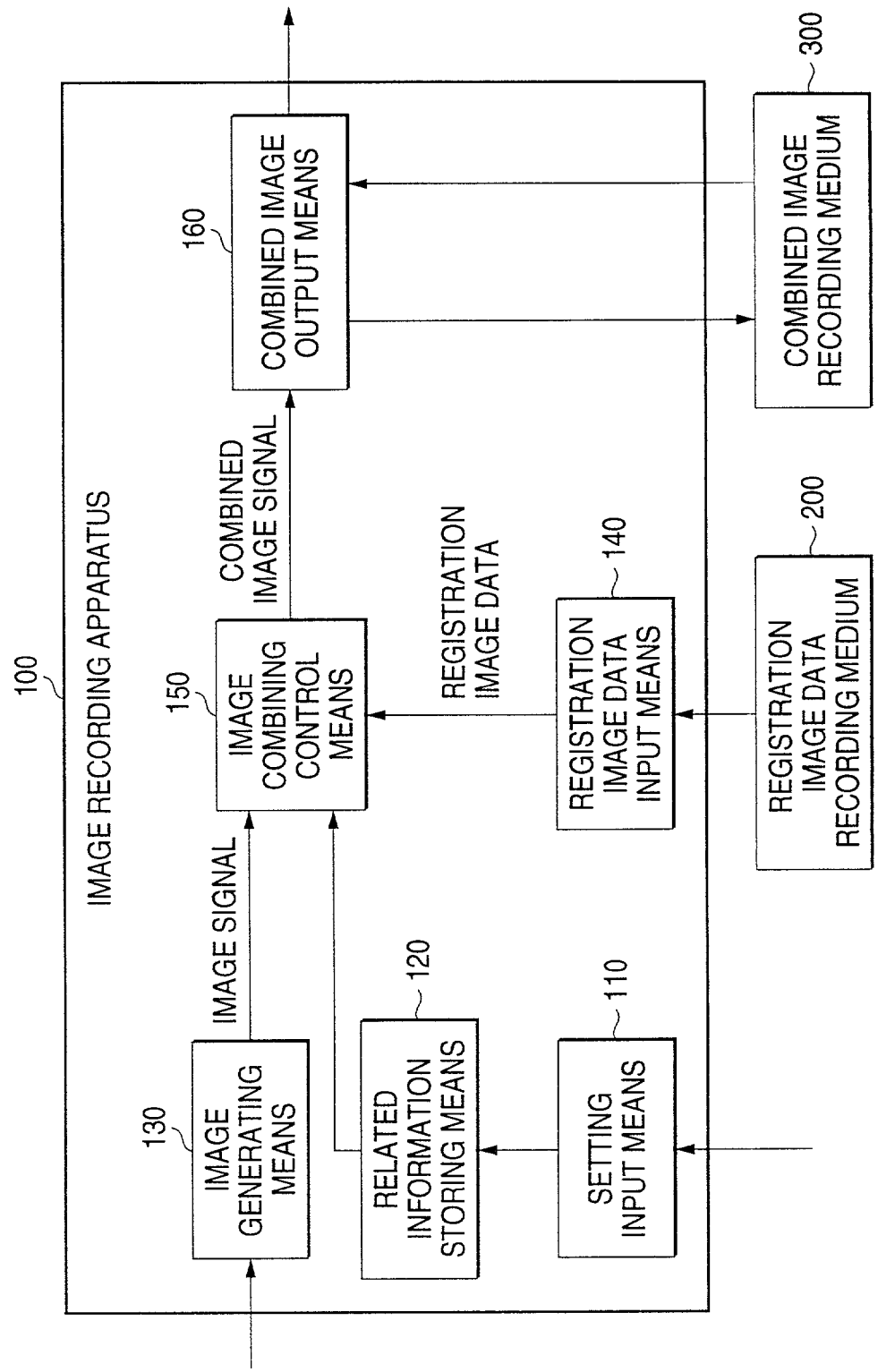
FIG. 1 is a block diagram showing the configuration of an image recording apparatus according to an embodiment of the present invention.

Embodiments of the present invention will be hereinafter described with reference to the drawings. FIG. 1 shows the configuration of an image recording apparatus according to an embodiment of the invention.

An image recording apparatus 100 according to the invention is composed of a setting input means 110 for inputting setting information, a related information storing means 120 for storing information about an image to be combined and information relating thereto, an image generating means 130 for generating an image signal, a registration image data input means 140 for capturing registration image data into the inside of the apparatus, an image combining control means 150 for performing image combining, and a combined image output means 160 for outputting a combined image signal. A registration image data recording medium 200 and a combined image recording medium 300 can be attached to and removed from the image recording apparatus 100.

The setting input means 110 serves for input of various settings that are input by a user through a manipulation input device such as a keyboard or a touch panel, and performs prescribed processing on input information. Among such settings, settings (setting information) that are input in connection with registration of an image to be combined with an image signal to be generated by the image generating means 130 and information relating to the registration image are stored in the related information storing means 120.

The related information storing means 120 is a nonvolatile memory for storing information about a registration image that is input through the setting input means 110 and information relating thereto. Examples of information to be stored in the related information storing means 120 are the file name of registration image data, information to be used for judging legitimacy of file data, and setting information (e.g., insert, on/off, luminance-key/chroma-key, and mixing level) relating to an image. An example of information to be used for judging legitimacy of file data is a checksum.

The image generating means 130 receives an image, generates a prescribed image signal based on the received image, and outputs the generated image signal to the image combining control means 150. For example, the image generating means 130 is an imaging means that captures an external image optically and converts it into an electrical signal. More specific examples are a digital camera that produces a still picture by shooting and a video camera that produces a moving picture by shooting.

The registration image data input means 140 reads out registration image data that is recorded in the registration image data recording medium 200 and outputs it to the image combining control means 150. At this time, if necessary, the registration image data input means 140 checks legitimacy of the read-out registration image data. For example, the registration image data input means 140 calculates a checksum of the read-out registration image data and collates it with a checksum that is stored in the related information storing means 120. If the registration image data recording medium 200 is not connected to the image recording apparatus 100 or there is no registration image data corresponding to the file name of a registration image that is stored in the related information storing means 120, the registration image data input means 140 outputs a notice "no registration image data" to the image combining control means 150.

When acquiring registration image data from the registration image data input means 140, the image combining control means 150 generates a registration image signal based on the acquired registration image data and generates a combined image signal by combining it with an image signal that is acquired from the image generating means 130. Related information stored in the related information storing means 120 is referred to when the registration image signal is generated. The generated combined image signal is output to the combined image output means 160. When receiving a notice "no registration image data" from the registration image data input means 140, the image combining control means 150 does not perform image signal combining and outputs a notice "no combined image signal" to the combined image output means 160.

If the corresponding registration image data exists in the registration image data recording medium 200, the combined image output means 160 outputs the combined image signal generated by the image combining control means 150 to a prescribed output device such as a recording medium or a display device or an external signal output terminal. If the registration image data input means 140 could not acquire the corresponding registration image data, the combined image output means 160 refrains from output to the prescribed output device. For example, the combined image output means 160 records the combined image signal on the combined image recording medium 300 if the corresponding registration image data exists, and does not performing recording on the combined image recording medium 300 if the corresponding registration data does not exist. Signal output to the prescribed output device may be permitted when necessary. For example, if the corresponding registration image data does not exist, reproduction may be permitted though recording on the combined image recording medium 300 is not.

The registration image data recording medium 200 is a memory such as a memory stick. The image recording apparatus 100 can read out a content of the registration image data recording medium 200 via the registration image data input means 140. When it is intended to protect copyright, the registration image data is information (e.g., image data of the name of a copyrighter) about the copyright of an image signal that is generated by the image generating means 130. When it is intended to protect the ownership of the image recording apparatus 100, the registration image data may be any image data.

The combined image recording medium 300 is a prescribed recording medium for recording an output signal of the combined image output means 160. Examples of the combined image recording medium 300 are a magnetic disk, a video tape, and a film.

The operation of the image recording apparatus having the above configuration and an image processing method therefor will be described below.

The owner of the image recording apparatus 100 or the copyrighter of an image signal generated by the image recording apparatus 100 sets an image indicating a copyright and information relating thereto using the setting information input means 110 and stores those pieces of information in the related information storing means 120 in advance. When copyright protection is not intended, another kind of image may be registered. The registration image data file name of a registered image, settings of its combining method, and other information are stored in the related information storing means 120. The registration image data is stored in the registration image data recording medium 200 which is detachable.

When a prescribed image signal is generated by the image generating means 130, the image combining control means 150 receives the generated image signal and also receives, via the registration image data input means 140, the registration image data stored in the registration image data recording medium 200. Further, the image combining control means 150 generates a registration image signal based on the registration image data by referring to the setting information stored in the related information storing means 120, and combines it with the received image signal. At this time, the image combining control means 150 does not perform image signal combining if no corresponding registration image data exists in the registration image data recording medium 200 or the registration image data is not a legitimate one. The combined image output means 160 outputs a resulting combined image signal to the combined image recording medium 300, for example. Like the image combining control means 150, the combined image output means 160 does not perform output if no corresponding registration image data exists in the registration image data recording medium 200 or the registration image data is not a legitimate one.

The above description is such that the image combining control means 150 generates a combined image signal by combining an image signal with a registration image signal. However, if "insert" of the setting information about an image is set to "off," the image signal may be output as it is without being combined with a registration image signal.

Figure 2:
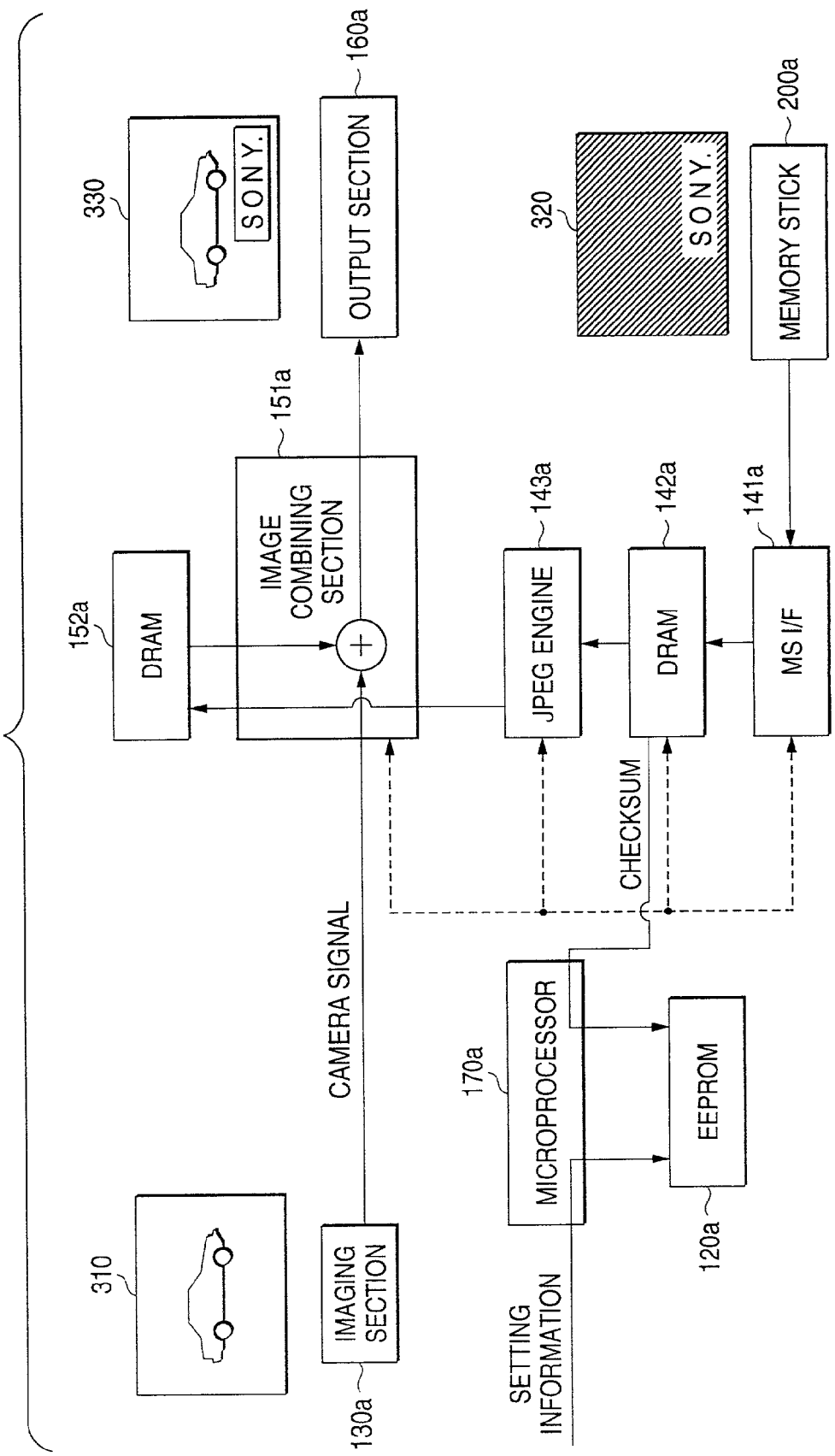
FIG. 2 is a block diagram showing the configuration of a camera-incorporated VTR according to an embodiment of the invention.

Next, a camera-incorporated VTR as a specific example of the image recording apparatus according to the invention will be described. FIG. 2 shows the configuration of a camera-incorporated VTR according to an embodiment of the invention.

The camera-incorporated VTR according to the invention is composed of an EEPROM 120a that is the related information storing means, an imaging section 130a that is the image generating means, a memory stick interface (MS I/F) 141a, a DRAM 142a, and a JPEG engine 143a that are the registration image data input means, an image combining section 151a and a DRAM 152a that are the image combining control means, an output section 160a that is the combined image output means, and a microprocessor 170a for controlling the entire apparatus. A memory stick 200a that is the registration image data recording medium can be attached to and removed from the apparatus.

The EEPROM 120a is a memory for storing setting information that is input through the setting input means (not shown). The writing control for setting information is performed by the microprocessor 170a. Examples of setting information are settings of a registration image to be combined (this operation will be hereinafter assumed to be superimposition) with a camera signal produced by the imaging section 130a by shooting and settings as to how to superimpose the registration image. Those settings are processed by the microprocessor 170a and then written to the EEPROM 120a. If necessary, registration image data is read out from the memory stick 200a and a checksum is calculated and stored in the EEPROM 120a. The checksum is used for judging legitimacy of the registration image data. Once setting information is stored, the EEPROM 120a holds its contents even after power-off.

The imaging section 130a generates a camera signal of an image obtained by shooting an object and sends it to the image combining section 151a. For example, the imaging section 130a generates a camera image 310 and sends it to the image combining section 151a.

The memory stick interface (MS I/F) 141a reads out registration image data (e.g., an registration image 320) from the memory stick 200a and develops it in the DRAM 142a. The DRAM 142a is a memory for storing read-out registration image data temporarily. It is assumed here that the registration image data is coded according to the JPEG format. The JPEG engine 143a decodes the registration image data that is developed in the DRAM 142a and outputs a decoded registration image signal to the DRAM 152a which is an image processing memory. The individual sections are controlled by the microprocessor 170a.

The image combining section 151a superimposes the registration image signal that is supplied from the DRAM 152a on the camera signal that is supplied from the imaging section 130a according to certain settings stored in the EEPROM 120a, and outputs a combined image signal to the output section 160a. Being an image processing memory, the DRAM 152a temporarily stores the registration image signal that is supplied from the JPEG engine 143a and outputs it to the image combining section 151a. For example, the image combining section 151a generates a combined image 330 by superimposing the registration image 320 on the camera image 310. This superimposition processing is controlled by the microprocessor 170a.

The output section 160a outputs the combined image signal to a prescribed output device. For example, the output section 160a records it on a prescribed recording medium.

The microprocessor 170a not only controls the entire apparatus but also performs superimposition processing according to the setting information stored in the EEPROM 120a. When settings of the superimposition have been registered, the microprocessor 170a reads the registration image data of the memory stick 200a into itself and superimposes it on a camera image. If it is found after the setting that corresponding registration image data does not exist, the microprocessor 170a does not perform superimposition on the camera image and does not permit recording by the output section 160a. If the power to the apparatus is turned off and then turned on after registration of setting information, the microprocessor 170a judges whether registered image data exists in the memory stick 200a. If registration image data exists there, the microprocessor 170a automatically superimposes the registration image on a camera image according to the setting information and permits recording.

The memory stick 200a, which is a memory for storing registration image data, can be attached to and removed from the camera-incorporated VTR. When copyright protection is intended, the registration image data is a still picture to be used for claiming copyright such as a logo of the name of a copyrighter.

The operation of the camera-incorporated VTR having the above configuration and an image processing method therefor will be described below.

First, the memory stick 200a in which registration image data is stored for which superimposition registration should be performed is attached to the apparatus, and an image to be superimposed on a camera image is registered through the setting input means (not shown). For example, the registration information 320 is a logo indicating a copyright. The details of the manner of registration of setting information will be described below. The setting information is processed by the microprocessor 170a and recorded in the EEPROM 120a. The registration image data of the memory stick 200a is captured via the memory stick interface (MS I/F) 141a and developed in the DRAM 142a. When setting information is registered, a checksum of the registration image data that is developed in the DRAM 142a is calculated and recorded in the EEPROM 120a if necessary.

When registration has been completed, the microprocessor 170a superimposes the registration image on a camera image generated by the imaging section 130a according to the setting information and permits recording. Specifically, under the control of the microprocessor 170a, the registration image data developed in the DRAM 142a is decoded by the JPEG engine 143a and decoded image data is output to the DRAM 152a. The image combining section 151a generates a combined image signal by superimposing a registration image signal that is supplied from the DRAM 152a on a camera signal that is supplied from the imaging section 130a, and sends the combined image signal to the output section 160a. The output section 160a records the combined image signal on a prescribed recording medium. If necessary, the output section 160a outputs it to a reproducing device or the like. That is, a combined image 330 is generated by superimposing the registration image 320 on a camera image 310 and its recording is permitted.

If the power is turned on again after registration was once made, the setting information of the EEPROM 120a is checked. If there is a setting to the effect that superimposition should be performed, it is judged whether corresponding registration image data exists in the memory stick 200a. If there exists a file of the registration image data, the registration image data of the memory stick 200a is captured via the memory stick interface (MS I/F) 141a and developed in the DRAM 142a and its checksum is calculated. If the calculated checksum coincides with a checksum that is registered in the EEPROM 120a, a combined image 330 is generated by automatically superimposing the registration image 320 on a camera image 310 and recording is permitted according to the above-described procedure. If there is no corresponding image data file in the memory stick 200a or checksum coincidence does not occur, superimposition on the camera image 310 is not performed and recording is not permitted.

As described above, once setting information is registered, the registration image 320 is automatically superimposed on a camera image 310. This makes it possible to claim the copyright of an image produced by shooting with the camera-incorporated VTR. Since the registration image data is recorded in the memory stick 200a which is detachable, recording by the camera-incorporated VTR is disabled by removing the memory stick 200a. This prohibits the camera-incorporated VTR from being used against the intention of its owner. A theft prevention effect is attained in this manner.

Next, an image registration method will be described. FIGS. 3A and 3B to FIGS. 7A and 7B show manipulation pictures that appear in individual steps of image registration. Image registration manipulations are performed according to manipulation pictures. In this example, a logo image indicating a copyrighter is to be registered. Therefore, image registration will be called "logo registration" below.

Figure 3A:
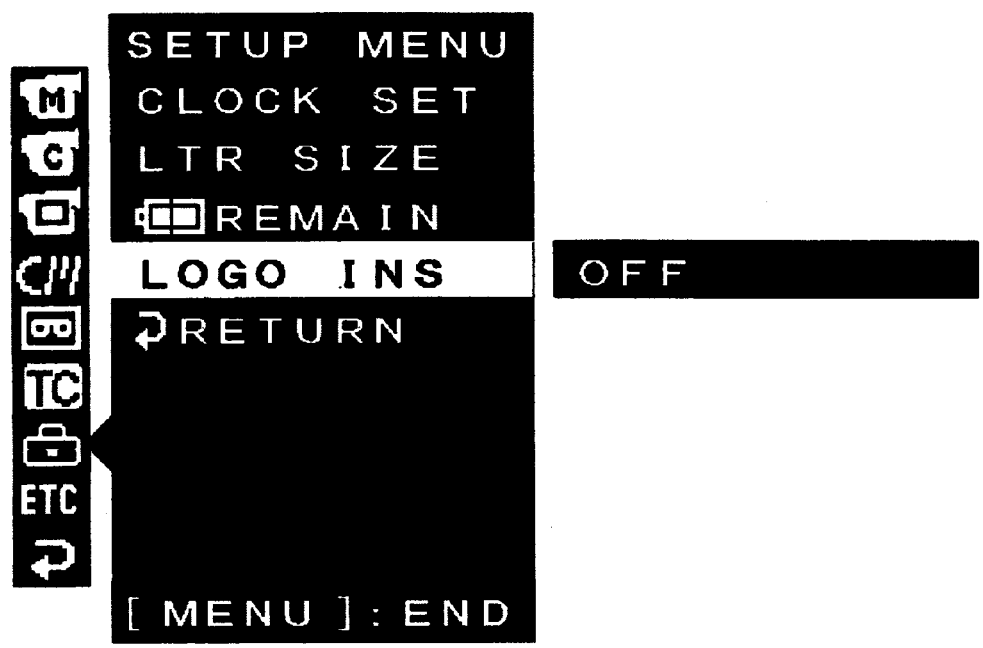
FIGS. 3A and 3B show manipulation pictures that appear in selecting logo registration from a manipulation menu.
Figure 3B:
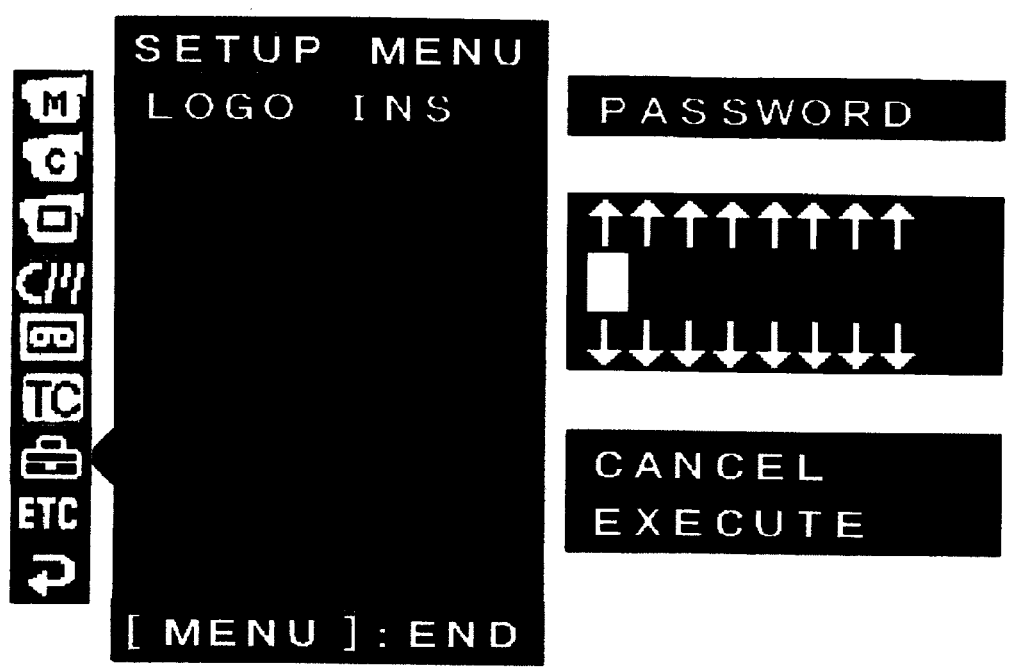

The first step will be described with reference to FIGS. 3A and 3B. FIGS. 3A and 3B show manipulation pictures that appear in selecting logo registration from a manipulation menu. As shown in FIG. 3A, a menu is opened and image registration ("LOGO INS") is selected from the menu. Then, a password is set if necessary (see FIG. 3B). A password thus set is written to the EEPROM 120a.

Figure 4A:
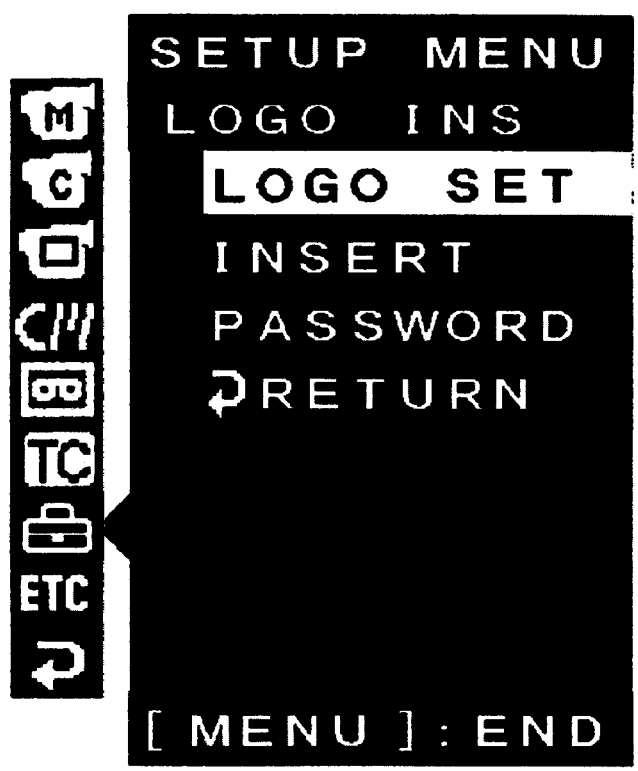
FIGS. 4A and 4B show manipulation pictures that appear in performing logo registration.
Figure 4B:
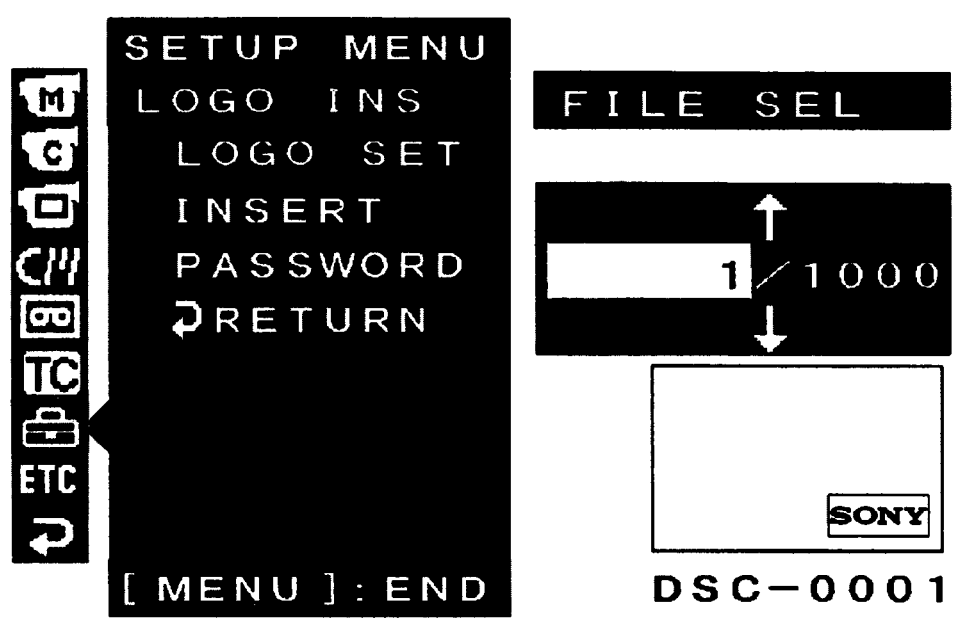

Then, logo registration manipulations are performed sequentially. FIGS. 4A and 4B show manipulation pictures that appear in performing logo registration. FIG. 4A shows a manipulation picture that appears after the logo registration has been selected in the above-described step. In this state, an item ("LOGO SET") for registering individual pieces of information is selected. When "LOGO SET" is selected, individual setting items are displayed one after another and setting is made according to such display. The first setting is setting of an image file to be superimposed (see FIG. 4B). A file name is set ("FILE SEL"); in this example, a file named "DSC-0001" is selected. For a check of the contents of the file, an image based on the selected image file is displayed.

Figure 5A:
FIGS. 5A and 5B show a chroma-key image and a luminance-key image, respectively.
Figure 5B:
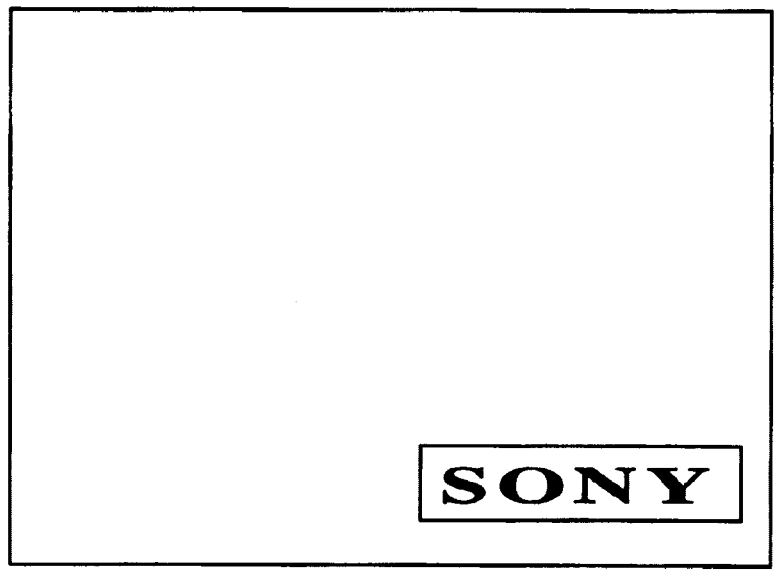
Figure 6A:
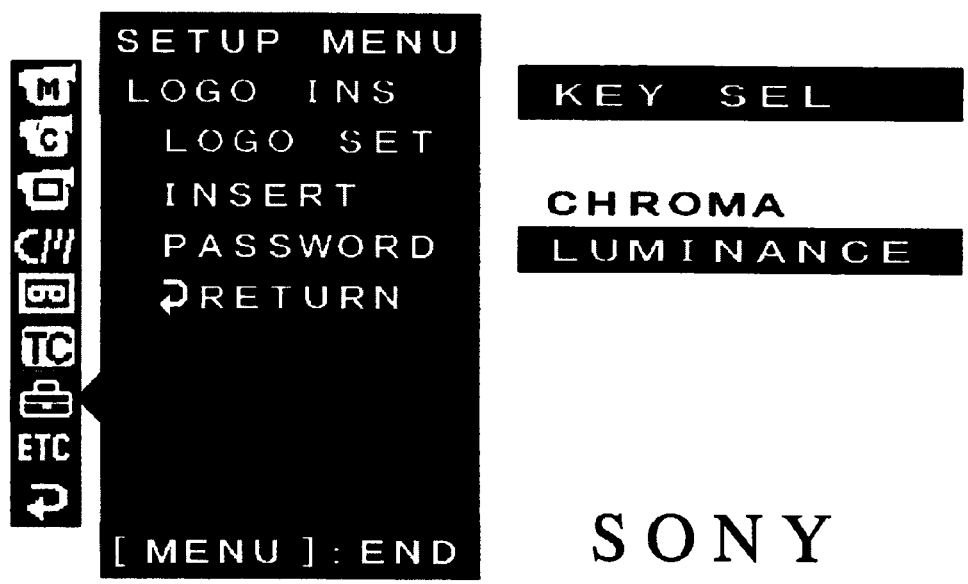
FIGS. 6A and 6B show manipulation pictures that appear in inputting settings that relate to display.
Figure 6B:
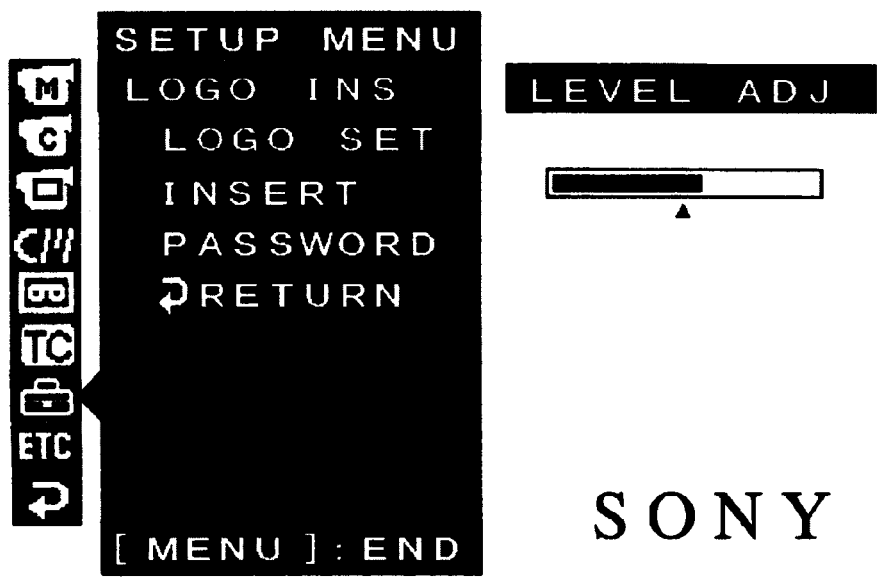

Subsequently, settings relating to display are input. First, a selection as to whether to superimpose the logo according to the chroma-key method or the luminance-key method is made. FIGS. 5A and 5B show a chroma-key image and a luminance-key image, respectively. The selection between the chroma-key method and the luminance-key method is made as appropriate in accordance with an image to be superimposed. Returning to the manipulation pictures, FIGS. 6A and 6B show pictures that appear in inputting settings relating to display. A selection ("KEY SEL") as to whether to perform display according to the chroma-key method or the luminance-key method is made (see FIG. 6A). In this example, the chroma-key method is selected and a chroma-key logo is displayed for a check. Then, a superimposition level is set ("LEVEL ADJ") as shown in FIG. 6B. A logo is displayed for a check according to the level thus set.

Figure 7A:
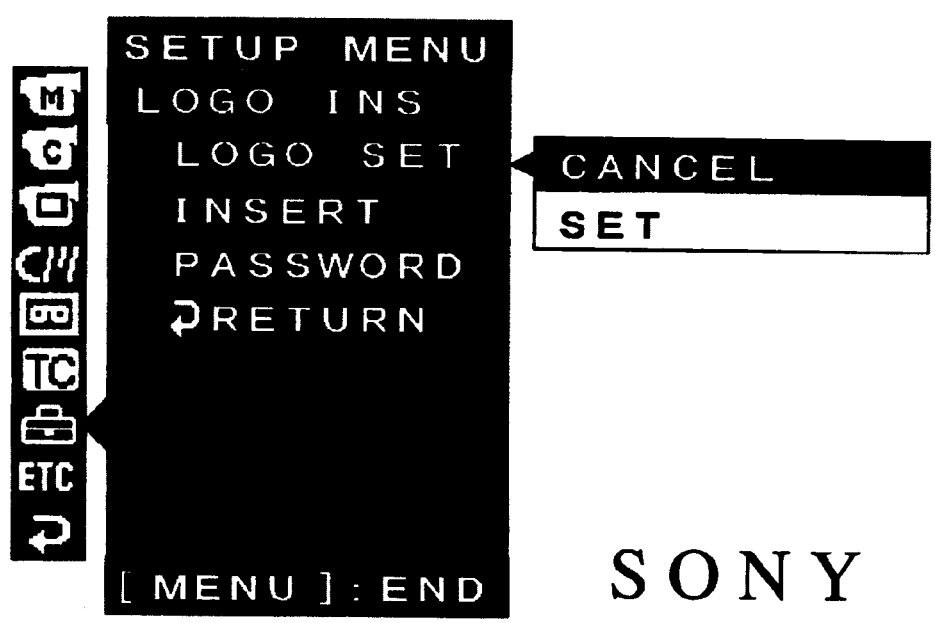
FIGS. 7A and 7B show manipulation pictures that appear in confirming a registered logo.
Figure 7B:
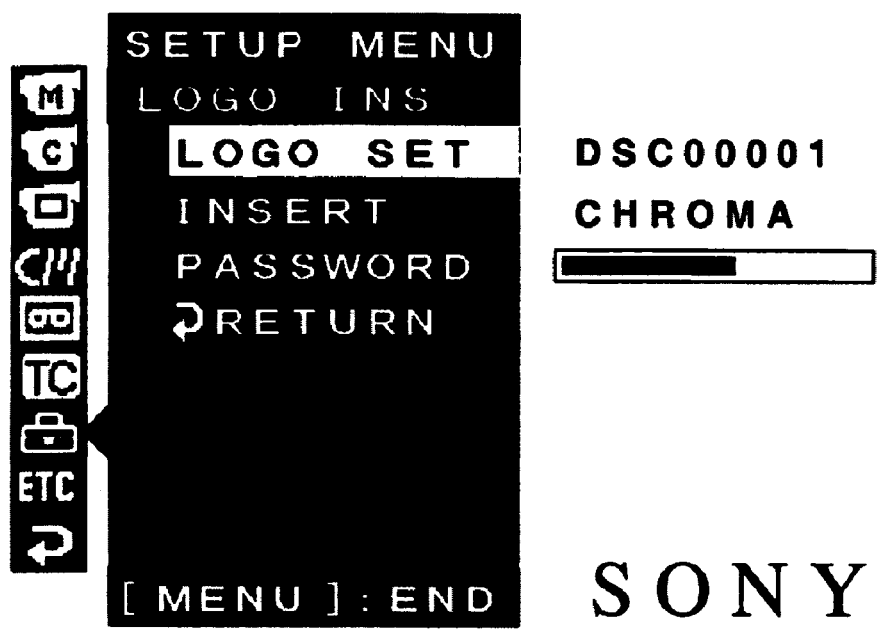

Subsequently, the setting information is confirmed and written to the EEPROM 120a. FIGS. 7A and 7B show manipulation pictures that appear in confirming the registered logo. The user judges whether the settings are proper by referring to a displayed logo image etc., and effects registration ("SET") as shown in FIG. 7A. When registration is effected, the file name, a checksum of the file data, and the setting contents (insert, on/off, luminance-key/chroma-key, and mixing level) are written to the EEPROM 120a. The set file name, the result of the luminance-key/chroma-key selection, and the setting of the mixing level are displayed in a manipulation picture (see FIG. 7B).

The above processing functions can be implemented by a computer. In this case, the processing contents of the functions that the image recording apparatus should have are described in advance in a program that is recorded on a computer-readable recording medium. The above described process is implemented by a computer by the computer's executing this program. Examples of the computer-readable recording medium are magnetic recording devices and semiconductor memories. The program may be distributed through the market by storing it in a portable recording medium such as a CD-ROM (compact disc-read only memory) or a floppy disk or by storing it on a storage device of a computer that is connected to a network and transferring it to other computers over the network. To execute the program on a computer, the program is stored in the hard disk drive or the like of the computer and is executed after being loaded into the main memory.

As described above, in the one image recording apparatus according to the invention, an image containing information about the copyright of an arbitrary image and its related information are registered in advance. When an image signal of the arbitrary image is generated, registration image data is read out, a registration image signal is generated by referring to the related information, and a combined image signal is generated by combining the registration image signal with the image signal of the arbitrary image. The combined image signal is output to an arbitrary device including a prescribed recording medium.

By registering an image containing information about a copyright in advance as described above, every time an arbitrary image signal is generated subsequently, an image as a combination of the registration image and the arbitrary image is generated automatically. As a result, the copyrighter can claim the copyright based on the generated image, enabling protection of the author's right.

In the other image recording apparatus according to the invention, a prescribed image to be combined with an arbitrary image and its related information are registered in advance. Image data of a registration image is stored in a detachable recording means in advance. When an arbitrary image signal is generated, the registration image data is read out. If the registration image data exists, a registration image signal is generated by referring to the related information and a combined image signal is generated by combining the registration image signal with the image signal of the arbitrary image. The generated combined image signal is output to an arbitrary device. If the registration image data does not exist, a combined image signal is neither generated nor output to the arbitrary device.

By setting a registration image in advance as described above, presence/absence of registration image data is checked every time an arbitrary image signal is generated subsequently. If the registration image data does not exist, a combined image signal is neither generated nor output to the arbitrary device. Therefore, if a storing means in which the registration image data is stored is removed from the apparatus, the image recording apparatus cannot be used. As a result, the image recording apparatus is no longer used against the intention of its owner, enabling protection of the owner's right.

In the one processing method according to the invention, an image containing information about the copyright of an arbitrary image and its related information are registered in advance and registration image data is stored in advance. When an image signal of the arbitrary image is generated, a registration image signal is generated based on the registration image data by referring to the related information, and a combined image signal is generated by combining the registration image signal with the image signal of the arbitrary image. The generated combined image signal is output to an arbitrary device.

By registering an image containing information about a copyright in advance as described above, every time an arbitrary image signal is generated subsequently, an image as a combination of the registration image and the arbitrary image can be generated automatically. As a result, the copyrighter can claim the copyright based on the generated image, enabling protection of the author's right.

In the other image processing method according to the invention, a prescribed image to be combined with an arbitrary image and its related information are registered in advance. Image data of a registration image is stored in a detachable recording medium in advance. When an image signal of the arbitrary image is generated, the registration image data is read out from the detachable recording medium. If the registration image data exists, a registration image signal is generated by referring to the related information and a combined image signal is generated by combining the registration image signal with the image signal of the arbitrary image. The combined image signal is recorded on a prescribed recording medium. If the registration image data does not exist, combined image data is neither generated nor recorded on the prescribed recording medium.

By setting a registration image in advance as described above, presence/absence of registration image data is checked every time an arbitrary image signal is generated subsequently. If the registration image data does not exist, a combined image signal is neither generated nor recorded on the prescribed recording medium. Therefore, if the recording medium in which the registration image data is stored is removed from the apparatus, recording cannot be performed. As a result, the image recording apparatus is no longer used against the intention of its owner, enabling protection of the owner's right.

What is claimed is:

1. An image recording apparatus for recording an image signal of an arbitrary image comprising:
    image generating means for generating an image signal of the arbitrary image;
    registration image data input means for inputting a registration image associated with input legitimacy-check information of the registration image;
    related information storing means for storing information relating to the registration image, wherein the stored information includes stored legitimacy-check information;
    registration image data storing means for storing image data of the registration image;
    image combining control means for reading out the registration image data, generating a registration image signal based on the registration image data, and generating a combined image signal by combining the registration image signal with the image signal of the arbitrary image; and
    combined image output means for outputting the combined image signal to an arbitrary device including the prescribed recording medium,
        wherein the combined image output means does not output the combined image signal if the input legitimacy-check information does not coincide with the stored legitimacy-check information.

2. The image recording apparatus according to claim 1, wherein the registration image data storing means is detachable, and wherein the combined image output means does not record the combined image signal on the prescribed recording medium if the registration image data does not exist in the registration image data storing means.

3. The image recording apparatus according to claim 1, wherein the image generating means is imaging means for producing an image by shooting a prescribed object and converting it into an image signal.

4. The image recording apparatus according to claim 1, wherein the related information storing means is a nonvolatile memory.

5. The image recording apparatus according to claim 1, further comprising setting input means for inputting prescribed setting information including a setting of the registration image and a setting relating to display of the registration image, and for storing the setting information in the related information storing means.

6. An image processing method for an image recording apparatus that records an image signal of an arbitrary image including a still picture and a moving picture on a prescribed recording medium, comprising the steps of:
    registering a registration image containing information corresponding to the arbitrary image;
    generating first legitimacy-check information based on image data of the registration image;
    storing said first legitimacy-check information;
    generating an image signal of the arbitrary image;
    inputting registration image data corresponding to said registration image;
    generating a registration image signal based on the registration image data;
    generating second legitimacy-check information based on the inputted registration image data;
    generating a combined image signal by combining the registration image signal with the image signal of the arbitrary image; and
    outputting the combined image signal to an arbitrary device including the prescribed recording medium only if the second legitimacy-check information coincides with the first legitimacy-check information.

7. The image recording apparatus according to claim 1, wherein the related information further including setting information of the registration image for display.

8. The image recording method according to claim 6, wherein, in the storing step, setting information of the registration image used for display is stored along with the legitimacy-check information.

* * * * *